April 9, 1940. C. L. COUGHLIN 2,196,292
TRANSMISSION
Filed April 20, 1939 2 Sheets-Sheet 2

Inventor
Charles L. Coughlin

Patented Apr. 9, 1940

2,196,292

UNITED STATES PATENT OFFICE 2,196,292

TRANSMISSION

Charles L. Coughlin, Shorewood, Wis., assignor to Briggs & Stratton Corporation, Milwaukee, Wis., a corporation of Delaware Application April 20, 1939, Serial No. 268,867

10 Claims. (Cl. 74—281)

This invention relates to improvements in transmissions, and refers particularly to variable speed transmissions of the planetary type.

In general, transmissions of this type comprise two or more planet rollers mounted in a carrier which is driven from the prime mover to revolve the planet rollers in an orbit about a fixed axis, and wherein rotation of the planet rollers produced through frictional contact thereof with a stationary friction ring is transmitted to an orbit gear drivingly connected with the output shaft of the transmission through pinions connected with the planet rollers.

Inasmuch as the maintenance of a non-slipping engagement between the planet rollers of the friction ring is essential to proper functioning of the transmission, the planet rollers are pressed radially outwardly into firm engagement with the friction ring. Such outward pressure on the friction ring is permitted by having the rollers swing about one end and is effected by means of a cam on the drive shaft which applies its outward force on the free ends of the planet rollers in proportion to the input torque.

While the actual outward swinging motion of the planet rollers may be slight, there is nevertheless, some motion, and consequently, their pinions and the orbit gear with which the pinions mesh must be designed to accommodate relative tilting motion therebetween; but it has been found that no matter how accurate the machining of the pinions and orbit gear is, this relative tilting motion between the pinions and the gear causes exceptional wear because of the constant rubbing of the teeth on each other which soon impairs the operation of the transmission.

It is therefore an object of the present invention to provide a transmission of the character described in which the pinions are mounted rigidly in definite fixed relation to the orbit gear so that tilting motion between the pitch surfaces of the pinions and orbit gear is entirely eliminated.

A further object of this invention is to provide a practical driving connection between the planet rollers and the pinions which allows the planet rollers to swing outwardly as the transmission operates without imposing strain on the pinions and the gear or the bearings for the pinions.

With the above and other objects in view which will appear as the description proceeds, this invention resides in the novel construction, combination and arrangement of parts substantially as hereinafter described and more particularly defined by the appended claims, it being understood that such changes in the precise embodiment of the herein-disclosed invention may be made as come within the scope of the claims.

The accompanying drawings illustrate one complete example of the physical embodiment of the invention constructed in accordance with the best mode so far devised for the practical application of the principles thereof, and in which.

Figure 1:
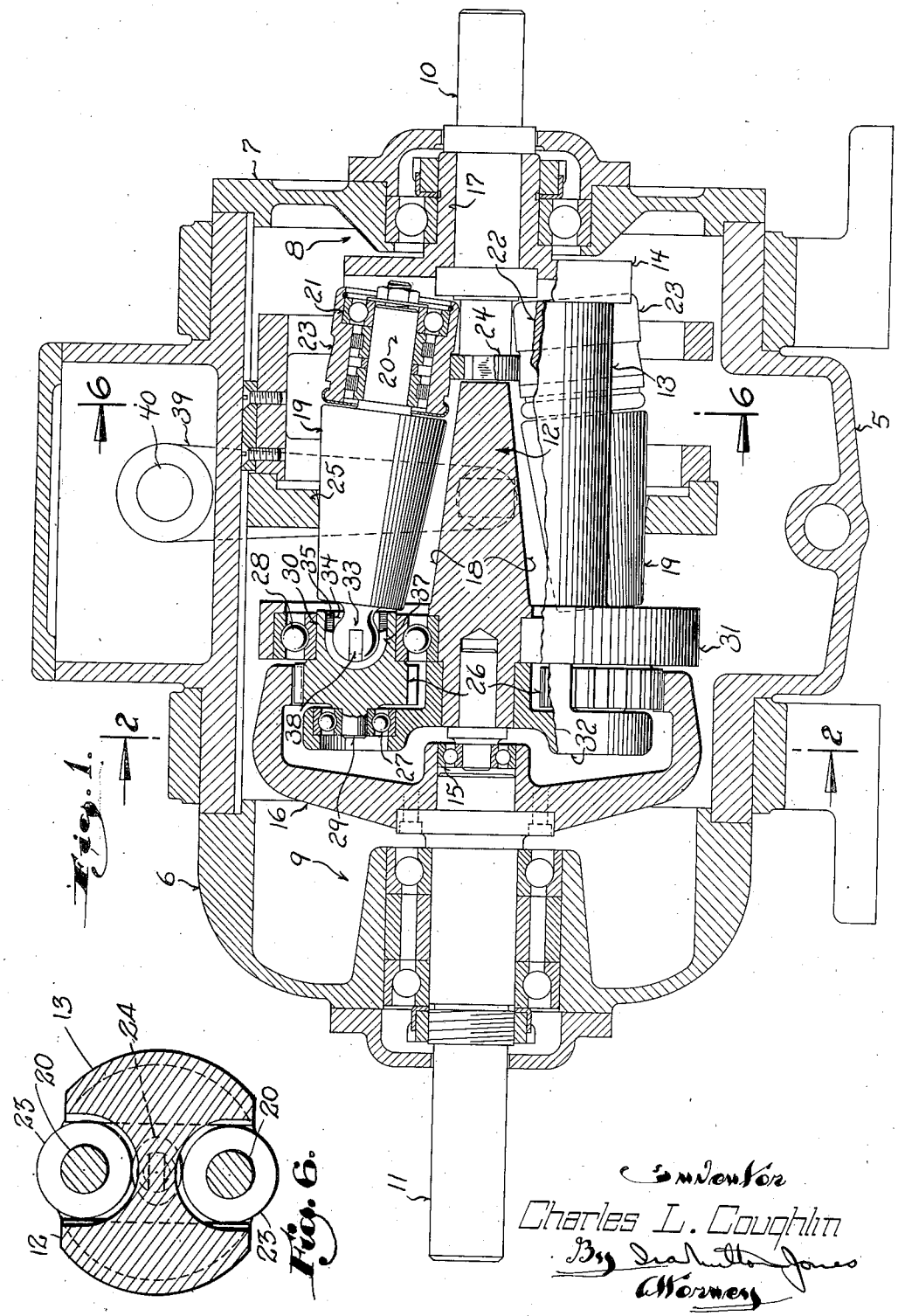
Figure 1 is a longitudinal sectional view through a transmission constructed in accordance with this invention.

Referring now particularly to the accompanying drawings in which like numerals indicate like parts, the numeral 5 designates the housing or body of the transmission which is substantially barrel-like and has its ends closed by plates 6 and 7. These end plates support bearings 8 and 9, respectively, in which an input shaft 10 and an output shaft 11 are journalled. The shafts are axially aligned and are drivingly connected through the mechanism of the transmission.

The mechanism of the transmission comprises a carrier 12, which consists of a central main casting 13 and an end plate 14. This carrier is supported at one end by a pilot bearing 15 receiving support from an orbit gear 16 which is secured to the driven output shaft 11, and at its opposite end by having the drive shaft 10 journalled in its end plate 14 and by having the bearing 8 receive a hub 17 on the end plate.

The carrier has two diametrically opposite cavities or chambers 18 in which planet rollers 19 are mounted. These planet rollers are tapered or conical and have their small diameter ends supported in a manner allowing the rollers universal motion about their small diameter ends. As a consequence, the large diameter ends of the rollers are free to swing outwardly radially with respect to the axis of rotation of the carrier.

At their large diameter ends, these planet rollers have stub shafts 20 journalled in bearings 21. The bearings 21 are guided for radial motion with respect to the axis of the carrier by the sides 22 of the cavities in the carrier. The medial portions of the outer shell 23 of the bearings 21 engage a cam 24 fixed to the inner end of the drive shaft 10.

This cam 24 tends to spread the adjacent ends of the planet rollers away from each other and presses the rollers into engagement with the inner surface of a friction ring 25 encircling the carrier and nonrotatably but axially slidably mounted in the housing of the transmission.

The planet rollers are mounted with their axes inclined with respect to the axis of the carrier at an angle equal to one-half their taper, which brings the outer edges of the planet rollers into parallelism with the main axis of the transmission.

As stated, the cam 24 engages the bearings supporting the large diameter ends of the planet rollers, and as load is applied to the transmission, outward pressure is imparted to the planet rollers by the cam in proportion to the input torque. The cam thus not only presses the rollers into firm frictional engagement with the ring 25, but also transmits the rotation of the drive shaft to the carrier causing the planet rollers to revolve in an orbit about the axis of the carrier.

As a consequence, the planet rollers rotate on their own axes, and this rotation of the planet rollers is utilized to transmit rotation to the orbit gear 16 and consequently the driven shaft.

To this end, each planet roller has a pinion 26 which meshes with the teeth of the orbit gear. Heretofore, these pinions were directly secured to the planet rollers so that any motion of the planet rollers in response to outward pressure thereon applied by the cam 24 was manifested in relative tilting between the pitch surfaces of the pinions and the orbit gear. This, of course, is highly undesirable.

With the present construction, the pinions 26 are firmly held in positions at which their pitch surfaces are truly tangent to the pitch surface of the orbit gear by having each pinion supported by two bearings 27 and 28. These bearings receive pinion stub shafts 29 and 30, respectively.

Figure 2:
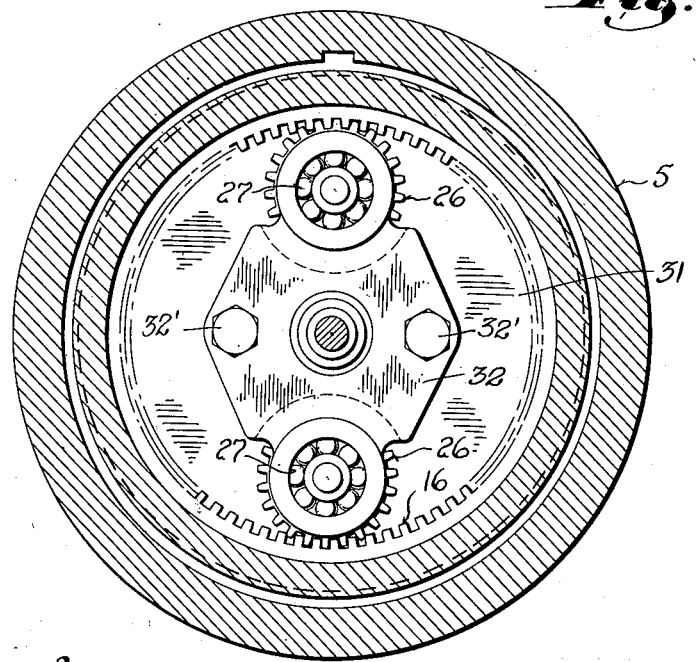
Figure 2 is a cross sectional view therethrough taken on the plane of the line 2—2 in Figure 1.
Figure 3:
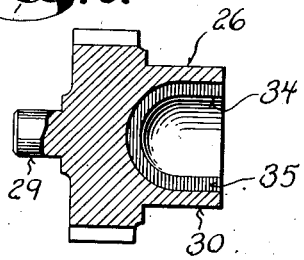
Figure 3 is a detail sectional view through one of the pinions per se.
Figure 4:
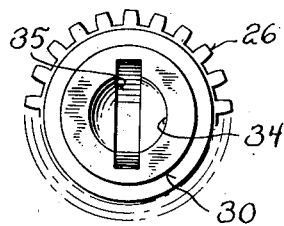
Figure 4 is an end view thereof.
Figure 5:
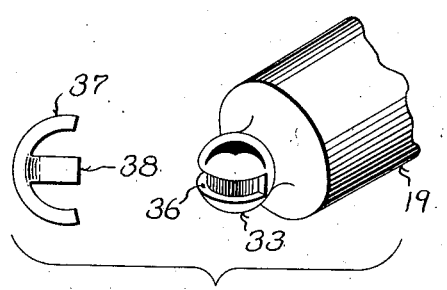
Figure 5 is a perspective view of the ball end of one of the planet rollers and the coupling member for coupling the same to its pinion.

The bearings 28 are mounted directly in the adjacent end wall 31 of the carrier and the bearings 27, which are in the nature of outboard bearings, are supported in a casting 32 fastened to the wall 31 by screws 32' as shown in Figure 2. In this manner, the pinions 26 receive firm support from the carrier and are held permanently with their axes parallel to the axis of the orbit gear so that their pitch surfaces have only a rolling contact with the pitch surface of the orbit gear.

Each pinion is nonrotatably connected with its planet roller through a universal joint driving connection. This connection comprises a ball 33 fixed with relation to the planet roller and received in a socket 34 in the adjacent stub shaft 30 of the pinion.

The wall of the socket has a continuous longitudinal groove 35 and the outer surface of the ball has a groove 36. These grooves receive the arms 37 and 38 of a spider-like coupling member. The arms 37 and 38 of this member are rigidly joined and are disposed at right angles to each other. The arm 37, which fits in the groove 35 of the socket, has its inner surface formed on a radius at least equal to that of the socket so as to lie flush therewith and not interfere with free movement of the ball in the socket, while the outer surface of the arm 38 is formed on a radius substantially equal to that of the ball so as to be substantially flush therewith and not interfere with movement thereof in the socket.

The speed ratio between the driving and driven shafts is adjusted by sliding the friction ring 25 longitudinally along the planet rollers. As the ring is moved toward the small diameter end of the rollers, the output speed of the transmission decreases and vice versa. The ring may be slid back and forth by a shifter fork 39 secured to a shaft 40 which projects from the housing to be actuated in any suitable manner.

From the foregoing description taken in connection with the accompanying drawings, it will be readily apparent that this invention provides a substantial improvement in variable speed transmissions of the type described as it completely eliminates the objectionable relative tilting between the pitch surfaces of the pinions and the orbit gear.

What I claim as my invention is:

1. In a transmission of the planetary type in which torque is transmitted from a driving shaft to a driven shaft through planet rollers supported by a carrier which is rotatable about a fixed axis by the driving shaft and wherein the rollers swing radially outwardly with respect to the axis of rotation of the carrier; a driving connection between the planet rollers and the driven shaft comprising: an orbit gear coaxial with the carrier and drivingly connected with the driven shaft, said orbit gear being adjacent to one end of the planet rollers; pinions drivingly connected to the planet rollers directly at those ends of the rollers which lie adjacent to the orbit gear; and means rotatably mounting said pinions and rigidly holding them in positions at which their teeth mesh with the teeth of the orbit gear and the axis of each pinion generates a cylindrical surface during rotation of the carrier which cylindrical surface is concentric to the common axis of the carrier and orbit gear and immovably fixed with relation to said common axis.

2. In a transmission of the planetary type in which torque is transmitted from a driving shaft to a driven shaft through planet rollers supported by a carrier which is rotated by the drive shaft, and wherein the rollers swing radially outwardly with respect to the axis of rotation of the carrier: a driving connection between the planet rollers and the driven shaft comprising, an orbit gear coaxial with the driven shaft and drivingly connected therewith; a pinion drivingly connected with each planet roller and meshing with the orbit gear; and bearings permanently axially parallel with the axis of the driven shaft rotatably mounting the pinions.

3. In a transmission of the planetary type in which torque is transmitted from a driving shaft to a driven shaft through planet rollers supported by a carrier which is rotated by the drive shaft, and wherein the rollers swing radially outwardly with respect to the axis of rotation of the carrier: a driving connection between the planet rollers and the driven shaft comprising, an orbit gear rotating on a fixed axis and drivingly connected with the driven shaft; a pinion for each planet roller meshing with said orbit gear; a bearing for each of said pinions immovably held with its axis parallel to the axis of the orbit gear; and a universal joint connection between each pinion and its planet roller.

4. In a transmission of the planetary type in which torque is transmitted through planet rollers revoluble about a fixed axis and rotatable on their own axes, and wherein the planet rollers swing outwardly about one of their ends: an orbit gear; a pinion for each planet roller adjacent to one end thereof and meshing with the orbit gear; means rotatably mounting each pinion and constraining the same to only rotation on its own axis and revolution about said fixed axis so that the pitch surface of each pinion is tangent to and has true rolling contact with the pitch surface of the orbit gear; and cooperating means carried by each pinion and the adjacent end of its planet roller to provide a universal joint driving connection between each pinion and its planet roller.

5. In a transmission of the planetary type: the combination with tapered planet rollers revoluble in an orbit about a fixed axis and rotatable on their own axes, said planet rollers being swingable about their small diameter ends; and an orbit gear adjacent to the small diameter ends of the planet rollers; of a pinion for each planet roller meshing with the orbit gear; a universal joint driving connection between each pinion and its planet roller; bearings in which said pinions are journalled; and means supporting the bearings and constraining them to revolution about said fixed axis at fixed radial distances therefrom so that the pinions are held with their pitch surfaces tangent to the pitch surface of the orbit gear.

6. In a transmission of the character described; an orbit gear rotatable on a fixed axis; a planet roller revoluble about said axis and rotatable on its own axis; a pinion adjacent to one end of the planet roller and meshing with the orbit gear; a universal joint driving connection between the pinion and said end of the planet roller; and means rotatably mounting the pinion for revolution about said fixed axis, said means holding the pinion with its pitch surface tangent to that of the orbit gear while enabling swinging movement of the planet roller about its end adjacent to the pinion.

7. In a transmission of the character described: an orbit gear rotatable on a fixed axis; a planet roller revoluble in an orbit about said axis and rotatable on its own axis; a pinion meshing with the orbit gear; endwise spaced axially aligned bearings between which the pinion is journalled; and means supporting said bearings for revolution about the axis of the orbit gear at fixed radial distances from said orbit gear axis; and a ball and socket universal driving connection between the pinion and the adjacent end of the planet roller whereby the planet roller is free to swing about the center of the ball and socket joint without affecting proper meshing between the pinion and the orbit gear.

8. In a transmission of the character described: a carrier rotatable on a fixed axis; axially aligned spaced apart bearings on the carrier outwardly of its center; a pinion between said bearings; a journal for the pinion supported in each of said bearings; a planet roller having one end adjacent to the pinion and nonrotatably connected therewith, said nonrotatable connection serving to support the planet roller at said end and permitting the roller a degree of universal motion about said end; and means on the carrier constraining the opposite end of the planet roller to a predetermined motion with respect to the carrier.

9. In a transmission of the character described: a carrier rotatable on a fixed axis; endwise spaced axially aligned bearings on the carrier a distance outwardly of its center; a pinion between said bearings; a stub shaft projecting from one face of the pinion journalled in one of the bearings; a socketed stub shaft projecting from the opposite face of the pinion journalled in the other bearing; a planet roller having a ball at one end received in the socketed stub shaft of the pinion; means providing a nonrotatable driving connection between the ball of the planet roller and socketed stub shaft of the pinion while enabling swinging motion of the planet roller about the center of its ball; and guide means on the carrier constraining the opposite end of the planet roller to a predetermined motion with respect to the carrier.

10. In a transmission of the character described: a carrier rotatable on a fixed axis; a planet roller supported in said carrier to travel therewith in an orbit about the axis of rotation of the carrier; a pinion nonrotatably drivingly connected with one end of the planet roller; and three endwise spaced bearings for the planet roller and pinion supported on said carrier, one of said bearings being located between the pinion and the adjacent end of the planet roller, another of said bearings being at the opposite side of the pinion, and the remaining bearing supporting the opposite end of the planet roller, said first two designated bearings being fixed in the carrier against any motion whatsoever with respect thereto.

CHARLES L. COUGHLIN.